(12) United States Patent
Moretto

(10) Patent No.: US 8,763,273 B2
(45) Date of Patent: Jul. 1, 2014

(54) HOPPER STRUCTURE, DEHUMIDIFICATION PLANT AND METHOD FOR DEHUMIDIFYING GRANULAR PLASTIC MATERIAL

(75) Inventor: Renato Moretto, Padua (IT)

(73) Assignee: Moretto S.p.A. (IT)

( * ) Notice: Subject to any disclaimer, the term of this patent is extended or adjusted under 35 U.S.C. 154(b) by 18 days.

(21) Appl. No.: 13/195,996

(22) Filed: Aug. 2, 2011

(65) Prior Publication Data

US 2012/0030964 A1 Feb. 9, 2012

(30) Foreign Application Priority Data

Aug. 3, 2010 (IT) ............................. VR2010A0158

(51) Int. Cl.
*F26B 3/00* (2006.01)
(52) U.S. Cl.
USPC ................................. 34/487; 34/168; 34/443
(58) Field of Classification Search
USPC ............ 454/182; 34/487, 491, 416, 168, 443, 34/165, 167
See application file for complete search history.

(56) References Cited

U.S. PATENT DOCUMENTS

| | | | |
|---|---|---|---|
| 3,634,949 A | | 1/1972 | Louks |
| 3,793,742 A | * | 2/1974 | Rainville et al. ................ 34/586 |
| 3,875,683 A | | 4/1975 | Waters |
| 4,448,134 A | * | 5/1984 | Foote ............................ 110/245 |
| 4,974,336 A | * | 12/1990 | Hahn .............................. 34/443 |
| 6,199,294 B1 | * | 3/2001 | Becker .............................. 34/80 |
| 7,568,297 B2 | * | 8/2009 | Pierson et al. .................. 34/218 |
| 2004/0076555 A1 | | 4/2004 | Wagner .......................... 422/139 |
| 2006/0080859 A1 | * | 4/2006 | Moretto .......................... 34/443 |
| 2009/0205219 A1 | * | 8/2009 | Moretto .......................... 34/482 |

FOREIGN PATENT DOCUMENTS

| | | |
|---|---|---|
| DE | 849830 C | 9/1952 |
| EP | 2090856 A1 | 8/2009 |
| FR | 2674944 A1 | 10/1992 |
| WO | WO 02/36255 A1 | 5/2002 |

OTHER PUBLICATIONS

Italian Search Report dated Mar. 21, 2011, issued in corresponding Italian priority application No. VR2010A000158.
Examination Report dated Sep. 6, 2012 issued in corresponding European Patent Application No. 11 176 382.7 (3 pages).

* cited by examiner

*Primary Examiner* — Kenneth Rinehart
*Assistant Examiner* — Jason Lau
(74) *Attorney, Agent, or Firm* — Ostrolenk Faber LLP

(57) ABSTRACT

A hopper for dehumidification of granular plastic material by a dehumidifying fluid includes a main body, having a top wall with an opening for the granular plastic material; at least one discharge opening for the dehumidifying fluid provided on the main body or the top wall, a tapered lower section with a discharge opening for the dehumidified granular plastic material, a fluid-sealed insert member delimiting an annular air space with the main body and the tapered lower section, and at least one dehumidifying fluid feed duct to the annular air space, the lower tapered section comprising at least one pair of walls to delimit at least one chamber that is outside the annular air space and in fluid communication therewith, the at least one chamber being feedable with dehumidifying fluid from the at least one feed duct oriented tangentially or parallel to an enclosing wall.

15 Claims, 11 Drawing Sheets

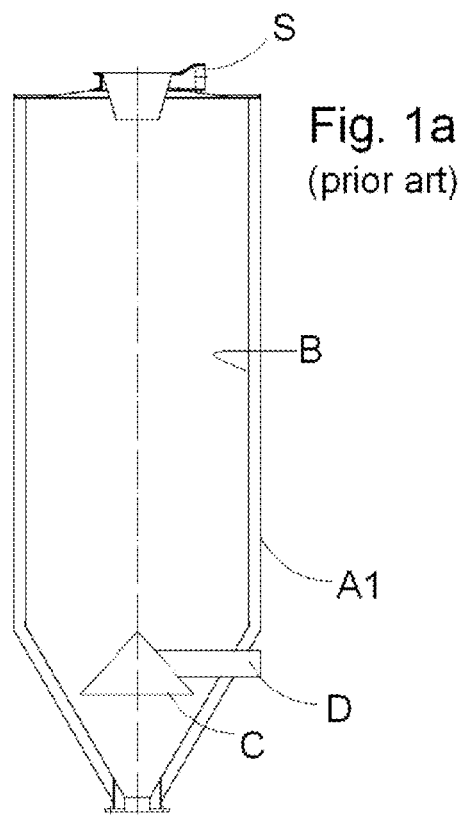
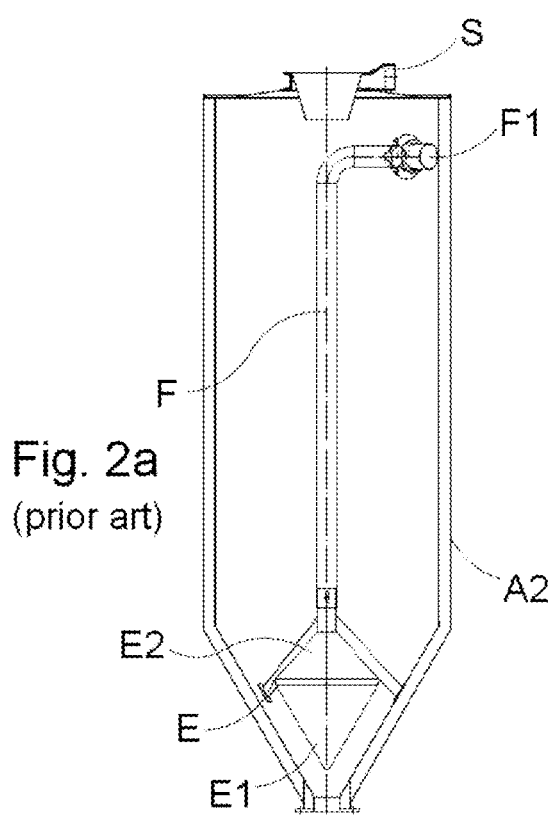
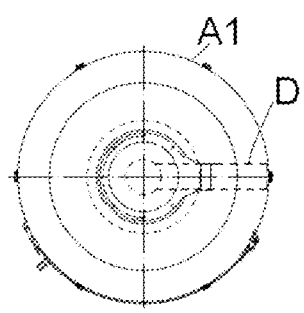
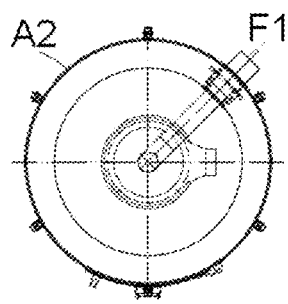
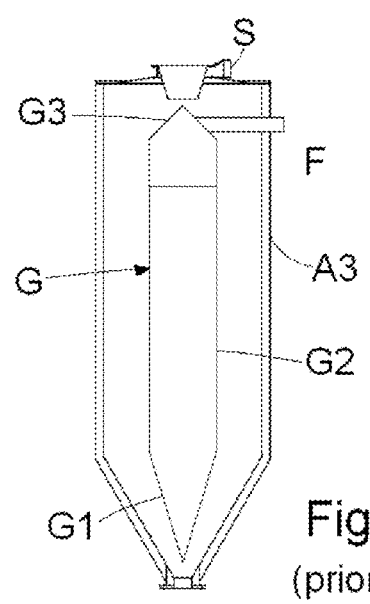
Fig. 1a (prior art)
Fig. 1b (prior art)
Fig. 2a (prior art)
Fig. 2b (prior art)
Fig. 3 (prior art)

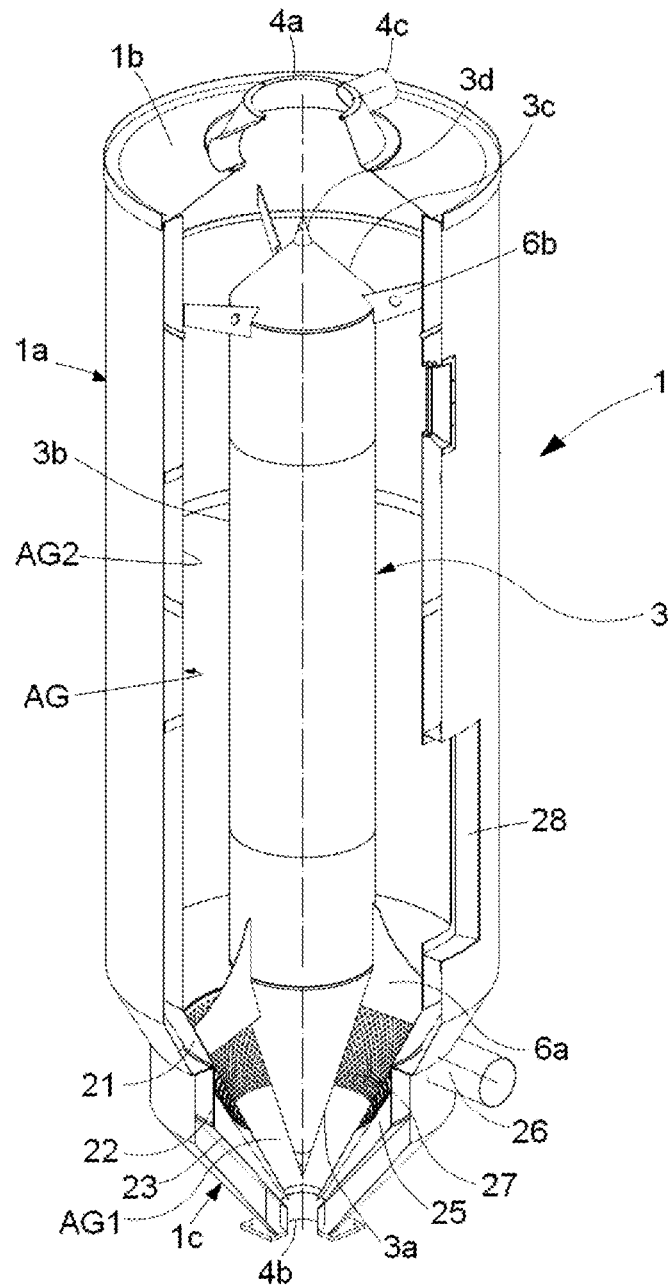

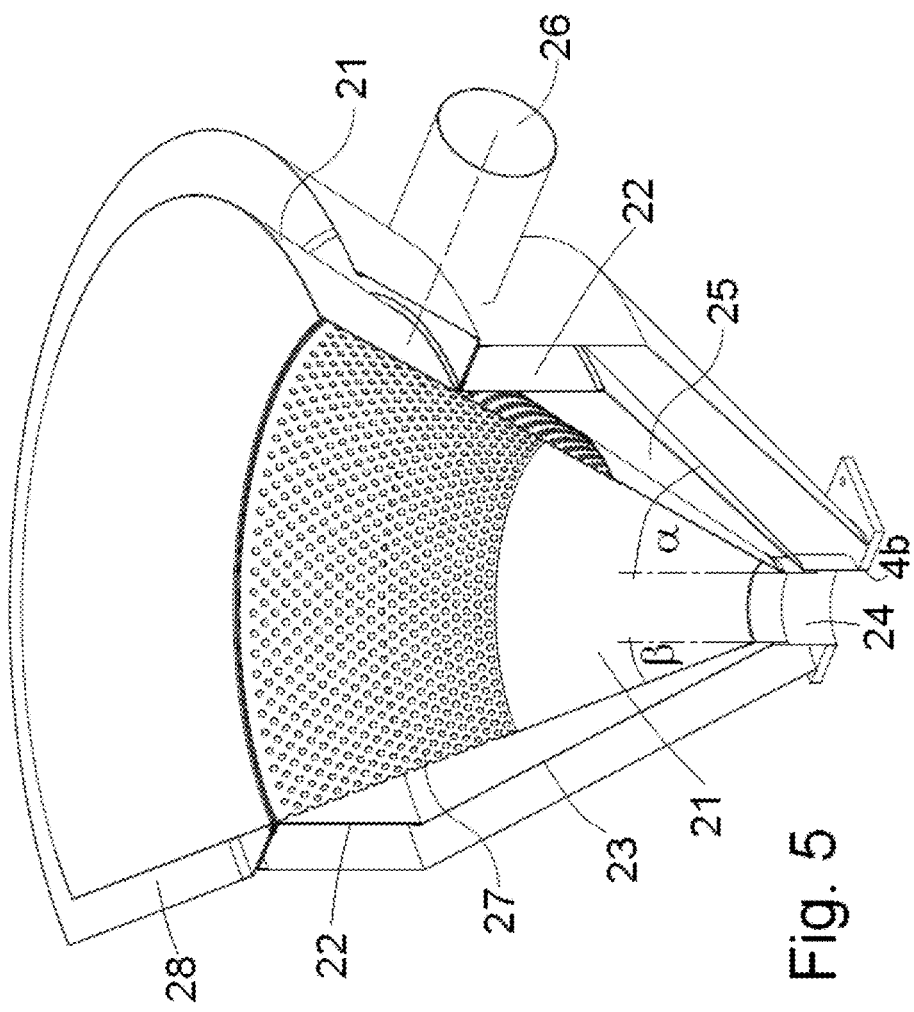

HOPPER STRUCTURE, DEHUMIDIFICATION PLANT AND METHOD FOR DEHUMIDIFYING GRANULAR PLASTIC MATERIAL

FIELD OF INVENTION

The present invention relates to a hopper structure and a plant for treating granular plastic material, and a method for dehumidifying granular plastic material in a hopper.

In the present patent application, the terms "granules" or "granular" are meant to indicate chips, small laminas or plates produced by the grinding-crushing of plastic material in slab, sheet, film or similar form.

The term "hopper" is intended to mean any type of container, sometimes also called a silo, having a cross section, e.g. circular, square or rectangular, and terminating at its lower part with a tapered discharge section equipped with a discharge mouth, usually controlled by a suitable discharge valve.

BACKGROUND OF THE INVENTION

As is known, in the process of transformation of most plastic materials into granules or granular materials, a very important treatment consists of the process of dehumidification of the plastic material granules, i.e. the removal of the water contained in the granules of those polymer materials which are hygroscopic.

The elimination of the moisture from the hygroscopic granules is necessary since the granules themselves must be subjected (during the transformation steps) to melting at relatively high temperature; during such steps, the residual water molecules contained in the granules can be inserted into the molecular chains of the polymers and cause their breakage. If the molecular chains should break, as will be understood, poor quality final products would be obtained; in any case, products would be obtained with inadequate mechanical characteristics, considering that bubbles, blowholes, coloration non-uniformity and other undesired phenomena are often generated, ascribable to the presence of water in the starting granules.

The granular plastic materials to be subjected to dehumidification are typically stored in fluid tight hoppers connected to a generator device of hot and dry air, commonly called a "dryer", which is intended to feed or insufflate hot and dry air, so-called process air, into the hoppers.

Once it has entered into the hopper, the process air crosses all or part of the mass of plastic material granules to be dehumidified, removing the moisture contained therein, and then it exits from the hopper through a suitable outlet duct.

In a dehumidification process in a hopper as described above, the degree of attainable dehumidification for a given granular plastic material depends on many factors, such as the residence time of the granular plastic material inside the dehumidification hopper, the flow rate of hot and dry air through the hopper, the treatment temperature and the thermo-fluid-dynamic behavior in the interaction between the air current and the granular plastic material, the latter also depending on the internal geometry of the hopper.

For each granular plastic material to be dehumidified, the dehumidification degree required or to be attained is established, or in any case it is established at the start of the dehumidification process. For such dehumidification degree, the residence time interval of the granules in the hopper is established, as well as the process temperature, so as to allow the diffusion of the water molecules from the granule interior to outside the granules.

As is known, the phenomenon of the diffusion of water molecules inside the granular material is governed by the equation of Fick's second law:

$$\frac{dC}{dt} = D\frac{d^2C}{dX^2}$$

where C is the concentration of the water molecules, which depends on the time t and on the spatial coordinates X of the granule, and D is the diffusion coefficient of the moisture in the specific plastic granular material.

The diffusion coefficient, in turn, depends on other variables according to the Arrhenius model:

$$D = D_0 \exp\left(\frac{-U}{kT}\right)$$

in which $D_0$ is a diffusion constant which depends on the type of material to be treated, U is the activation energy, k is the Boltzmann constant and T is the temperature in Kelvin.

It will be understood, therefore, that obtaining and maintaining a uniform temperature in the granules residing in a dehumidification hopper is of fundamental importance, at least in the radial direction, i.e. in the granules at the same cross section of the dehumidification hopper.

If, instead, the granules had different temperatures in radial direction, there would be different diffusion constants D, and different dehumidification degrees would be obtained in the granules, which would negatively affect the characteristics of the manufactured article or final product.

Furthermore, according to the analysis of Fick's second law, one infers that it is of fundamental importance that the residence time of the granules of one same material in a hopper is nearly the same. Different residence times in a hopper in fact lead to different moisture concentrations in the granules exiting from the dehumidification hopper.

If the granules of a same material must remain for the same residence time in a hopper, i.e. in the step of descent of the granular material into the dehumidification hopper, this means that the vertical components of the velocity field of the single granules must remain substantially constant over an entire cross section of the hopper.

It should be recalled that the flow that is established during the descent of the granular material inside the hopper can be mainly of two types: "mass flow" and "funnel flow".

The "mass flow" flow type is characterized by uniform descent of the material inside the hopper, i.e. the modules of the various velocity vectors along a straight section of the hopper will be similar; in other words, the granular material descends in a uniform manner and preferential descent channels are not formed therein.

On the other hand, the "funnel flow" flow type has a discontinuity in the values of the vector modules along a cross-section of the hopper. The velocity vectors in the central part of the hopper along a same cross-section will have a greater value than that of the modules of the velocity vectors close to the walls of the hopper. This leads to the formation of a preferential descent channel of the material in the central part of the hopper, which naturally occurs for the hopper structures lacking inserts, like those described hereinbelow.

In many applications, typically in the field of plastic material working, it is essential that a "mass flow" type behavior of the granular material be obtained in the descent step in the hopper.

Solutions have already been proposed that provide for pre-arranging, in a dehumidification hopper, a hollow insert composed of a body with constant cross section terminating on its lower part with a conical portion. One such solution, which allows obtaining a mass flow, is for example taught in the European patent application EP-2 090 856 in the name of the same applicant of the present application, where it is provided that the hollow interior of the insert is in fluid communication with the outlet of a dryer and the lower conical portion of the insert is perforated or pierced, such that by feeding air from the dryer to the insert, pressurized process air is fed at the conical portion of each insert into the granules loaded in the hopper.

With one such solution, a uniform descent is obtained of the granular material inside the hopper, and the residence time of the plastic material granules to be treated is substantially the same for all the granules. Nevertheless, with one such hopper structure, in the plastic material granules located at a same level, i.e. in the radial direction, one obtains an undesired thermal gradient, which can involve non-uniform levels of dehumidification of the granules, i.e. granules are obtained having different moisture levels, which can compromise the qualitative characteristics of the final manufactured product.

U.S. Pat. No. 3,875,683 teaches a hopper for dehumidifying plastic material granules, which is suitable for keeping the dehumidification air at a predetermined and constant temperature. Such a hopper includes a main body having an upper cylindrical section, and a lower tapered portion; the main body further includes an upper loading mouth for loading plastic material granules, and a discharge opening for the dehumidified material granules.

An insert member is located inside the main body, thereby delimiting therewith an annular space for the material to be dehumidified. A plurality of holes is formed on the wall of the insert member.

The lower tapered portion of the main body includes two walls, one external wall enclosing an internal wall, in such a way as to delimit a chamber external to the annular space, and in fluid communication therewith, and to this end a number of holes is formed on the internal wall of the external chamber. The external chamber is put in fluid communication with the internal part of the insert member by means of ducts.

Moreover, the hopper structure comprises heating means located inside the insert member and the external chamber. Optionally, further heating means can be located adjacent to an upper wall of the main body.

With such a hopper, the dehumidified gas is supplied to the chamber, passes partly through the holes formed on the internal wall thereof, and partly is fed to the inner zone of the insert (by means of the above-mentioned ducts), and crosses the respective holes, thereby entering the annular space.

Owing to such a structure, the material granules are crossed by a stream of dehumidified gas having the same temperature for the whole height of the hopper. Thus, the exhaust gas, after having crossed the material to be dehumidified, has a temperature very close to the temperature at which it has been supplied to the hopper.

U.S. Pat. No. 3,875,683 aims at devising a hopper in which the dehumidification gas temperature is kept constant in the whole annular space containing the material to be dehumidified.

In plants for working plastic material granules, the granules should not be subjected to thermal stress, otherwise their rheological properties can be negatively affected. Therefore, in the hopper, it is fundamental to obtain a correct thermal gradient along the vertical axis of the hopper, and not a constant temperature as obtainable with the solution taught by U.S. Pat. No. 3,875,683.

Moreover, with the hopper taught by such US patent, a satisfying dehumidification with a reduced energy consumption cannot be obtained.

In this regard, it should be noted that the gas discharged from the hopper has the same (high) temperature of the gas supplied into the hopper, and thus it should be cooled before being regenerated, since, as it is known, the regeneration is carried out at low temperatures, e.g. a temperature lower than 40°.

FR-2 674 944 A1 teaches an apparatus for dehumidifying plastic material granules including a hopper having a lower tapered section, a duct tangentially connected to the lower tapered section, and a fan for supplying gaseous fluid into the duct. The apparatus further includes a conical insert member, located in the hopper and having an apex turned upward, the insert member delimiting with the hopper an annular space for the material to be dehumidified.

The lower tapered section of the hopper has two walls, one enclosing the other, thereby delimiting a chamber. A number of holes are formed throughout the whole length of the internal wall of the lower tapered section. The dehumidifying air is supplied to the tangential duct, and then to the external chamber, from which it enters and rises along the annular space, thereby crossing the granular material to be dehumidified.

SUMMARY OF THE INVENTION

The main object of the present invention is to provide a hopper structure for the dehumidification of granular plastic material that is capable of ensuring a substantially constant residence time in a hopper of the plastic material granules and to prevent or drastically reduce the formation of thermal gradients of the granules being situated at a same level in the dehumidification hopper.

Another object of the present invention is to provide a hopper structure for the dehumidification of granular plastic material that is suitable for ensuring a motion field, for the dehumidifying fluid fed into the hopper, that is more uniform than the hopper structures proposed up to now.

Another object of the present invention is to provide a dehumidification plant which is suitable for effectively achieving the dehumidification of granular plastic material with reduced energy consumption compared to the dehumidification plants of the state of the art.

Another object of the present invention is to provide a dehumidification method that allows ensuring a uniform dehumidification of the plastic material granules.

According to a first aspect of the present invention a hopper structure for the dehumidification of granular plastic material by means of a dehumidifying process fluid is provided, including:
- a main body, bearing, at the top in use, a closure wall with loading opening or mouth for the granular plastic material to be treated;
- at least one discharge mouth or opening for the process fluid provided on the main body or on the closure wall,
- a tapered lower wall terminating with a discharge opening for the dehumidified granular plastic material,
- an insert member fluid-sealed and positionable in the main body and in the tapered section so as to delimit an annular air space therewith, the insert member comprising at least one conical or frustoconical lower part, which tapers towards the bottom thereof, and an upper part, and at least one dehumidifying fluid feed duct to the annular air space, the lower tapered section comprising at least one pair of walls or wall segments: a wall or wall segment at least partially enclosing the other wall or wall segment, so as to delimit at least one chamber therewith that is outside the annular air space and in fluid communication therewith, the chamber being feedable with dehumidifying process fluid from the at least one feed duct oriented tangentially or parallel to the enclosing wall or wall segment.

According to another aspect of the present invention, a method of dehumidifying plastic granular material is provided, which comprises the following steps:

prearranging a hopper structure according to the present invention;

feeding granular plastic material at the upper loading mouth; and feeding dehumidifying process fluid into the at least one feed duct and thus into the chamber, and subsequently into the air space.

According to another aspect of the present invention, a treatment plant for granular plastic material is provided, comprising a hopper according to the present invention, a feeder of granular plastic material into the hopper, conveyor means intended to convey, to a user, metered quantities of dehumidified granular material coming from the hopper, and a dryer set to supply dehumidifying process fluid to the hopper.

BRIEF DESCRIPTION OF THE DRAWINGS

Further aspects and advantages of the present invention will be clearer from the following detailed description of several currently preferred hopper structure embodiments thereof, illustrated by way of merely exemplifying and non-limiting examples in the drawings, in which:

FIGS. 1a and 1b are, respectively, side elevation and plan views of a hopper structure according to the state of the art;

FIGS. 2a and 2b are views similar to FIGS. 1a and 1b of another hopper structure according to the state of the art;

FIG. 3 is a view similar to FIG. 1a of another hopper structure according to the state of the art;

FIG. 4 is a slightly top perspective view with parts removed of a hopper structure according to the present invention;

FIG. 5 is a view of a detail in enlarged scale of FIG. 4;

FIG. 10 shows a graph of the temperature profile, relative to the probe positioned in the tapered lower portion of a hopper structure according to the present invention illustrated in FIG. 9b and a hopper according to the state of the art illustrated in FIG. 9a;

In the drawings, the same or similar parts or components were marked with the same reference numerals.

DETAILED DESCRIPTION OF THE PREFERRED EMBODIMENTS

Figure 6A:
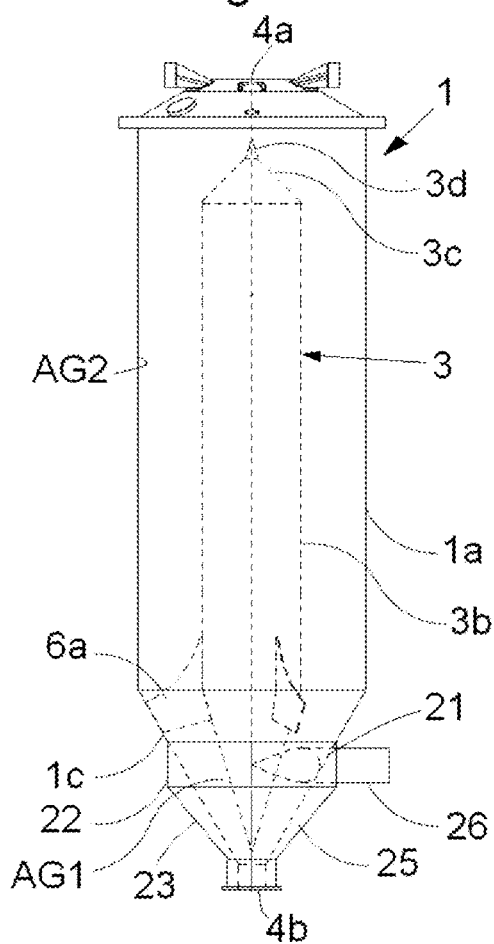
FIGS. 6a and 6b are views, respectively side elevation and plan, of a hopper structure according to FIG. 4.

As specified above, various hopper structures have already been proposed, such as that of the hopper A1 illustrated in FIGS. 1a and 1b, which comprises a cylindrical body terminating with a tapered lower portion delimiting a treatment chamber B for a granular plastic material to be treated. At the upper part (upper in use) of the tapered lower portion, a hollow, conical diffuser insert C is provided with apex turned upward. The insert interior is in fluid communication with a radial insufflation duct D, in turn in communication with an external treatment fluid source (hot and dry air), typically a dryer.

During the dehumidification process, therefore, the air is fed to the insufflation duct D and comes into contact with the material present in the treatment chamber B at the lower edge or conical base of the insert C, in order to rise inside the treatment chamber until it exits at the top of the hopper through a suitable air discharge mouth S. With a hopper of this type, one obtains a poor dehumidification, since the various granules have different residence times in the hopper. Indeed, the vertical components of the velocity field of the single granules on a same cross section of the hopper, especially near the insert C, are not constant, since the granules that are for example situated in the zone above the conical insert C are slowed in their descent due to the friction with the wall of the insert.

In a hopper like that illustrated in FIGS. 1a and 1b, then, the distribution of the treatment air current or flow in the material to be dehumidified is not uniform.

Another hopper structure A2 already proposed at the state of the art is that illustrated in FIGS. 2a and 2b, which is similar to the hopper A1 illustrated in FIGS. 1a and 1b, but in place of the insert C, it provides for a hollow insert E with double conicity, i.e. having from the bottom to the top (in use), a first conical section E1 with diameter increasing from the bottom to the top and a second conical section E2 with diameter decreasing towards the top. The first conical section E1 is also pierced. The interior of the insert E is in fluid communication with an axial feed duct F whose inlet mouth F1 is at a top zone of the hopper.

Also with one such solution, it is not possible to obtain a high degree of dehumidification of the granular plastic material, since a constant descent velocity of granular plastic material cannot be obtained; nor can a correct distribution of the air current or flow in the granular plastic material be obtained.

The abovementioned patent application EP-2 090 856 instead teaches a hopper structure A3 equipped with a hollow insert G (FIG. 3) having a lower conical portion G1 arranged at the lower tapered section of the hopper and with its own apex turned towards the discharge mouth of the hopper A3, an intermediate cylindrical portion G2, extending over most of the cylindrical body of the hopper A3, and an upper conical portion G3 at the top zone of the hopper. The lower cone G1 is pierced in order to allow the diffusion in the hopper of hot and dry process air coming from a dryer. Pressurized process air coming from the dryer then enters into the feed duct F, flows from the top towards the bottom along the entire insert and exits from the small holes in the lower cone G1 in order to be diffused and rise through the material towards the top of the hopper A3, where it is discharged through the discharge mouth S.

A solution of this type, as indicated above, allows controlling the descent flow of the granular plastic material, thus obtaining a residence time that is substantially coinciding for all the granules of granular material loaded into the hopper, but it does not allow obtaining an optimal uniform distribution of the air in the air space delimited between the insert and the inner wall of the hopper. In addition, particularly at the tapered lower portion of the hopper A3, a desired treatment temperature cannot be established in sufficiently brief time periods.

The air must cross through an insert G of considerably greater size than the inserts C and E shown in FIGS. 1a and 2a and this ensures that, given the same volumetric fed air flow rate, the air inside the insert G of the embodiment of FIG. 3 has a lower velocity than that in the hopper of FIG. 2a with consequent lower kinetic energy possessed by the air current. The air current, therefore, does not have sufficient force to be uniformly distributed in the lower portion of the hopper, which prevents obtaining a uniform dehumidification treatment of the treated plastic material granules.

With reference to FIGS. 4, 5, 6a and 6b, a first hopper structure 1 embodiment is illustrated for the dehumidification of granular plastic material according to the present invention, which comprises a main body 1a, preferably cylindrical, bearing at the top (top in use) a closure wall 1b, and a tapered lower section 1c. The closure wall is equipped with a loading mouth or opening 4a for granular plastic material to be treated and with at least one discharge mouth 4c (two in the Figures) for a process fluid, such as a dehumidifying gaseous means. It will be understood that the discharge mouth(s) 4c could be provided for in an upper part of the main body 1a.

The lower tapered section 1c comprises at least one pair of walls or wall segments, one 23, 22 which at least partially encloses the other 21, so as to delimit at least one chamber 25 therewith outside an annular air space AG, which will be better described below.

Preferably, the lower tapered section 1c has a specific configuration formed by three walls or wall segments, i.e. starting from the main body 1a, an upper frustoconical segment 21, an intermediate cylindrical segment 22 and a lower frustoconical segment 23, the segments 22 and 23 constituting a wall enclosing the upper frustoconical segment. The upper frustoconical segment 21 is extended inside and over the entire length of the intermediate 22 and lower 23 segments, and is connected (welded) at its lower end to a sleeve 24, at which also the lower mouth or end of the lower segment 23 is fixed (welded). The lower tapered section terminates with a discharge opening 4b for the dehumidified granular plastic material.

An enclosing wall segment or wall 23 thus has height and taper angle α that are different from the height and taper angle β of the other wall or wall segment 21.

With this structure, the lower section 23 has a taper angle α different (greater) than the taper angle β of the upper segment 21, so that between the extension of the upper segment 21 and the wall segments 22 and 23, a closed fluid-sealed annular chamber 25 is delimited. Such chamber 25 is in fluid communication with the interior of the lower tapered section 1c of the hopper (and hence with an annular air space AG which shall be discussed below) through a multiplicity of small holes 27 uniformly distributed on one or more bands of the segment 21 for a height corresponding to at least the height of the intermediate section 22 (FIG. 5). In order to ensure the fluid seal of the chamber 25, the wall segment 21 is preferably welded to the edge of the intermediate section 22.

One or more dehumidifying fluid feed ducts 26 are then provided for (one of the Figures), intended to feed the chamber 25 with dehumidifying process fluid; the duct 26 being oriented tangentially or parallel to the enclosing wall 22, 23.

In this regard, if the enclosing wall has a substantial circular wall cross-section, the duct 26 will be oriented substantially tangentially to the enclosing wall, thereby supplying the dehumidifying fluid tangentially or peripherally (as will be better explained below), i.e. not radially into the chamber 25, whereas if the hopper includes an enclosing wall having a substantially square or rectangular cross section, the duct will be substantially parallel to a section of the enclosing wall, thereby supplying the dehumidifying fluid substantially tangentially or peripherally (as will be better explained below), i.e. not radially into the chamber 25.

More particularly, the cylindrical intermediate section 22 is crossed by the end of the process fluid feed duct 26, such end being substantially tangentially connected to the wall 22 of the chamber 25. The latter thus becomes a chamber with the function of collecting process fluid and homogenizing pressure before the passage of process fluid into the air space AG, and hence according to the embodiment illustrated in the Figures before crossing through the small holes 27.

Preferably, both the main body 1a and the tapered lower section 1c of the hopper 1 are formed by a double wall, i.e. an inner wall and an outer jacket, the outer jacket accurately copying the form of the corresponding inner wall and delimiting an air space 28 between the inner wall and the outer jacket. The latter is advantageously provided for housing a thermo-insulating material of any suitable type therein, e.g. rock wool or glass fiber, intended to reduce the heat losses of the hopper 1 towards the outside environment.

An insert element or member 3 is provided for, positionable in the main body 1a and in the tapered section 1c so as to delimit an annular air space AG therewith.

More particularly, the insert element 3, preferably hollow, is formed by a conical or frustoconical lower section 3a, which tapers towards the bottom, and an upper part, for example cylindrical. Preferably, the upper part of the insert element 3 includes an intermediate section 3b, e.g. cylindrical, and two successive top conical sections 3c and 3d with different conicities. The insert element 3 is made with fluid seal, e.g. the various parts composing the insert can be made of continuous sheet metal or even better lacking holes, the sheet metal sections then being connected to each other with fluid seal, e.g. welded.

The insert element 3 is axially arranged inside the hopper, so as to delimit a continuous annular air space AG with the inner walls of the same. For such purpose, the insert element 3 is supported and maintained in position by brackets connected on one side to the insert and on the other side to the main body 1a and/or to the tapered lower section 1c. More particularly, lower radial brackets 6a are provided for, which are angularly spaced and have one end thereof welded to the zone between cylindrical part 3b and conical or frustoconical lower section 3a of the insert and the wall segment 21 of the hopper. Upper radial brackets 6b are provided between the top of the upper part or the intermediate section 3b of the insert and the inner wall of the cylindrical body 1a of the hopper.

The annular air space AG preferably has a cylindrical intermediate section AG2 between cylindrical body 1a and cylindrical part 3b of the insert 3 and a lower section AG1 between conical wall segment 21 and conical or frustoconical lower part 3a of the insert.

Advantageously, the conical top sections 3c and 3d are tapered towards the top and are situated just below an axial loading mouth 4a in order to act as diffusers-distributers of the material as it is loaded into the hopper 1. On the opposite side, i.e. at the lower end of the wall segment 23, the hopper 1 has a discharge mouth 4b, advantageously delimited by the sleeve 24.

According to a variant of the present invention, several tangential feed ducts are provided for the dehumidifying process fluid (e.g. air or nitrogen), such ducts angularly distributed at the cylindrical intermediate wall segment 22, i.e. leading tangentially or in parallel manner into the pressure homogenization manifold chamber 25 and in communication with a process fluid source (dryer).

With one such structure of the hopper 1, dehumidifying gaseous means or air can be fed from the tangential duct or ducts 26 into the manifold chamber 25 with a tangential component, thus creating a whirling movement of gaseous means in the chamber 25 itself that favors a uniform distribution of the pressure, consequently determining a nearly uniform pressure passage along the entire zone with the small holes 27 of the chamber.

Preferably, the upper end of the tapered lower section 1c of the hopper 1 and the conical or frustoconical lower part 3a of the insert 3 are, in use, at a same level.

Figure 7A:
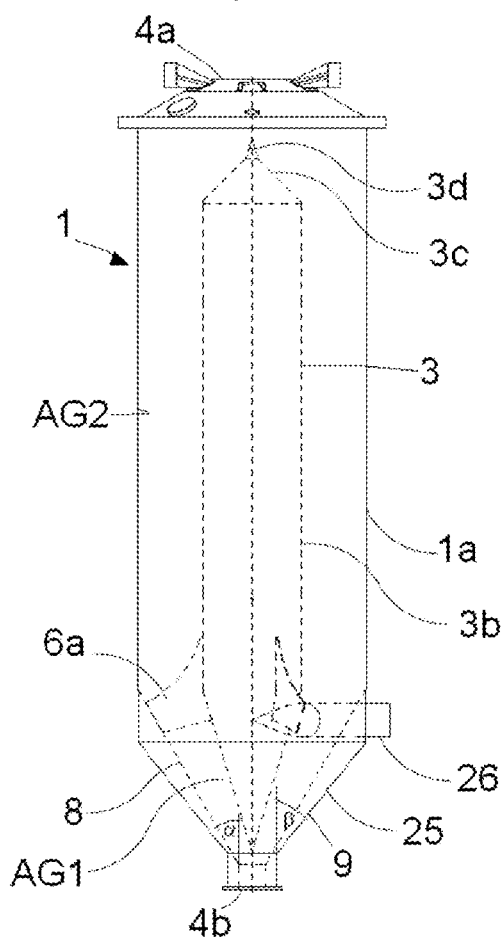
FIGS. 7a and 7b are views similar to FIGS. 6a and 6b of another hopper structure embodiment in accordance with the present invention.
Figure 6B:
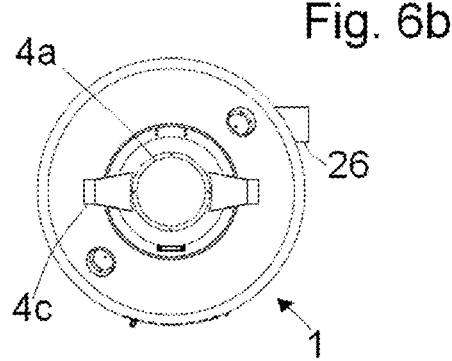
Figure 7B:
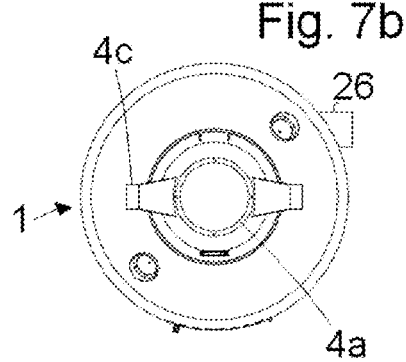

FIGS. 7a and 7b illustrate a hopper structure similar to that of the hopper 1, but in which the main body 1a, preferably cylindrical, is longer, i.e. it extends until it covers part of the lower conical section 3a of the insert 3 and the tangential feed duct 26 is situated in the cylindrical zone 1a, but always at the lower conical end 3a of the insert.

More particularly, the tapered lower section 1c comprises at least one pair of walls, one 9 at least partially enclosing the other 8, but with different height and taper angle α, β (taper angle α or conicity of the wall 9>taper angle or conicity β of the wall 8), so as to delimit therewith at least one chamber 25 outside the annular air space AG.

Still more particularly, the tapered lower section 1c does not have three segments, but rather a single frustoconical end, moreover constituted by two substantially coaxial frustoconical walls: one outer or enclosing wall 9 fluid-seal connected with the cylindrical main body 1a of the hopper and a longer inner wall 8, which from an upper level at the junction between the outer wall 9 and the main body 1a extends to the lower end of the wall 9. Due to the different conicity between the walls 8 and 9, the annular chamber 25 is delimited between them.

Preferably, the upper end of the tapered lower section 1c and more particularly of the wall 8 and of the conical or frustoconical lower part 3a of the insert 3 are at the same level in use.

With a hopper structure according to the present invention, a plastic granular material dehumidification method can be achieved which comprises the following steps:
  prearranging a hopper structure according to the present invention;
  feeding granular plastic material at the upper loading mouth 4a; and
  feeding dehumidifying process fluid into the feed duct and thus into the chamber, and subsequently into the air space.

More particularly, dehumidifying process fluid is tangentially fed into the chamber 25, so as to create a whirling state therein for obtaining a uniform insertion of fluid into the air space AG.

The dehumidifying process fluid is then conveyed into the chamber 25 and from here it is fed into the air space AG, preferably into the lower section AG1 of the air space AG, thus hitting the granular plastic material loaded in the air space. The process fluid will then rise upward inside the air space and more particularly in the cylindrical intermediate section AG2 of the air space, before it is discharged through the discharge mouth or opening 4c. The granular plastic material is instead fed into the loading mouth or opening 4a and then falls or descends into the annular air space AG in counter-current with respect to the dehumidifying process fluid, and then it is discharged, dehumidified, through the discharge opening 4b.

Figure 8:
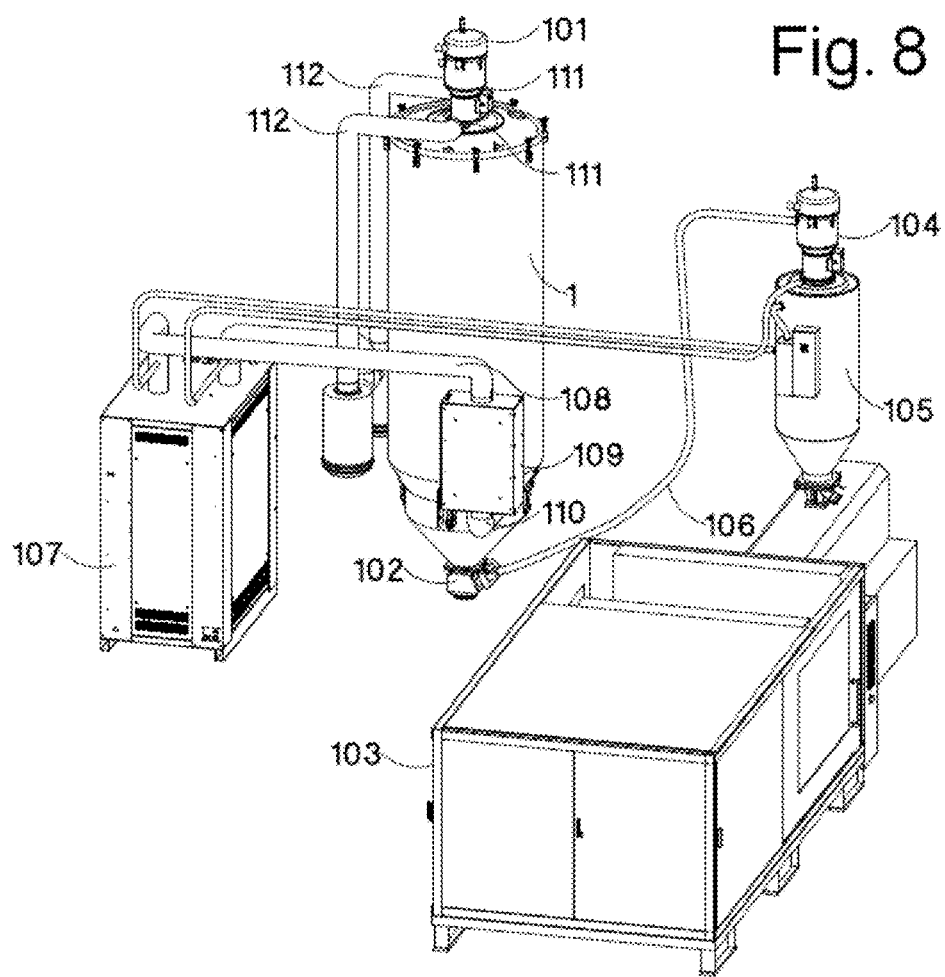
FIG. 8 schematically illustrates a dehumidification plant according to the present invention.

In FIG. 8, a dehumidification plant is illustrated according to the present invention for the treatment of granular plastic material, such as PET, for the production of preforms, for example.

Such plant comprises a hopper 1 according to the present invention, a feeder 101 of granular plastic material, by means of which it is possible to load granular plastic material inside the hopper 1 until it reaches a pre-established level.

Conveyor means 104, 105, 106 are then provided for, intended to convey metered quantities of dehumidified granular material coming from the hopper 1 to a user 103. More particularly, the hopper 1 has its own discharge mouth or opening 4b interceptable by a valve 102 which can discharge onto a conveyor of any suitable type, or into a suction duct 106 connected with suitable suction means 104, for feeding dehumidified granular material as a function of its specific residence time and of the requirement of a user means, such a molding press 103 of preforms.

If desired, the (dehumidified) granular plastic material, once suctioned by the suction means 104, is fed to an auxiliary hopper 105, e.g. positioned directly above the press 103. At the same time as such step, a corresponding load of granular material to be treated is fed at the top of the hopper 1 by means of the feeder 101.

A dryer 107 is also connected to the hopper 1. Such dryer provides dehumidifying process fluid, e.g. pressurized, to the hopper 1 loaded with granular plastic material to be treated (to be dehumidified), by means of a delivery duct 108, upon crossing a heating group 109 which has the task of bringing the fluid to the expected treatment temperature (typically 180° C. for the PET).

With one such plant, air is fed from the dryer 107 to the duct 26 and then to the chamber 25, and from here, through the small holes 27, and it is uniformly diffused in the granular plastic material before rising towards the top of the hopper.

Once it has passed through the granular plastic material (from the bottom to the top) and reached the top of the hopper, the exhaust air (i.e. loaded with moisture absorbed from the granular material) enters through one or more suitable dehumidifying process fluid discharge or outlet mouths 4c (FIG. 4) and into one or more return ducts 112, before it is once again returned to the dryer 107.

A solution according to the present invention, due to the specific structure of the tapered lower section of the hopper in combination with an insert 3 and of the tangential insufflation or feeding of dehumidifying gaseous means inside a pierced collection chamber 25, allows obtaining optimal performance with considerable lowering of the degree or amount of moisture in the treated granular plastic material, as well as a reduction of the energy consumption for the treatment of the granular material.

Due in fact to a uniform distribution of the air in the granular material situated in the air space between the inner wall of the hopper and the insert, as well as to the mass flow type of descent flow of the granular material (this being required by the configuration of the hopper and the insert, as described in the European patent application EP-2 090 856), the air flow rate necessary for a correct dehumidification of the granular material is much lower than the flow rate necessary in plants according to the state of the art. Consequently, the necessary energy consumption is considerably lower.

Experimental tests were conducted in order to test the effectiveness of a hopper structure 1 for the dehumidification of granular material according to the present invention.

Figure 9:
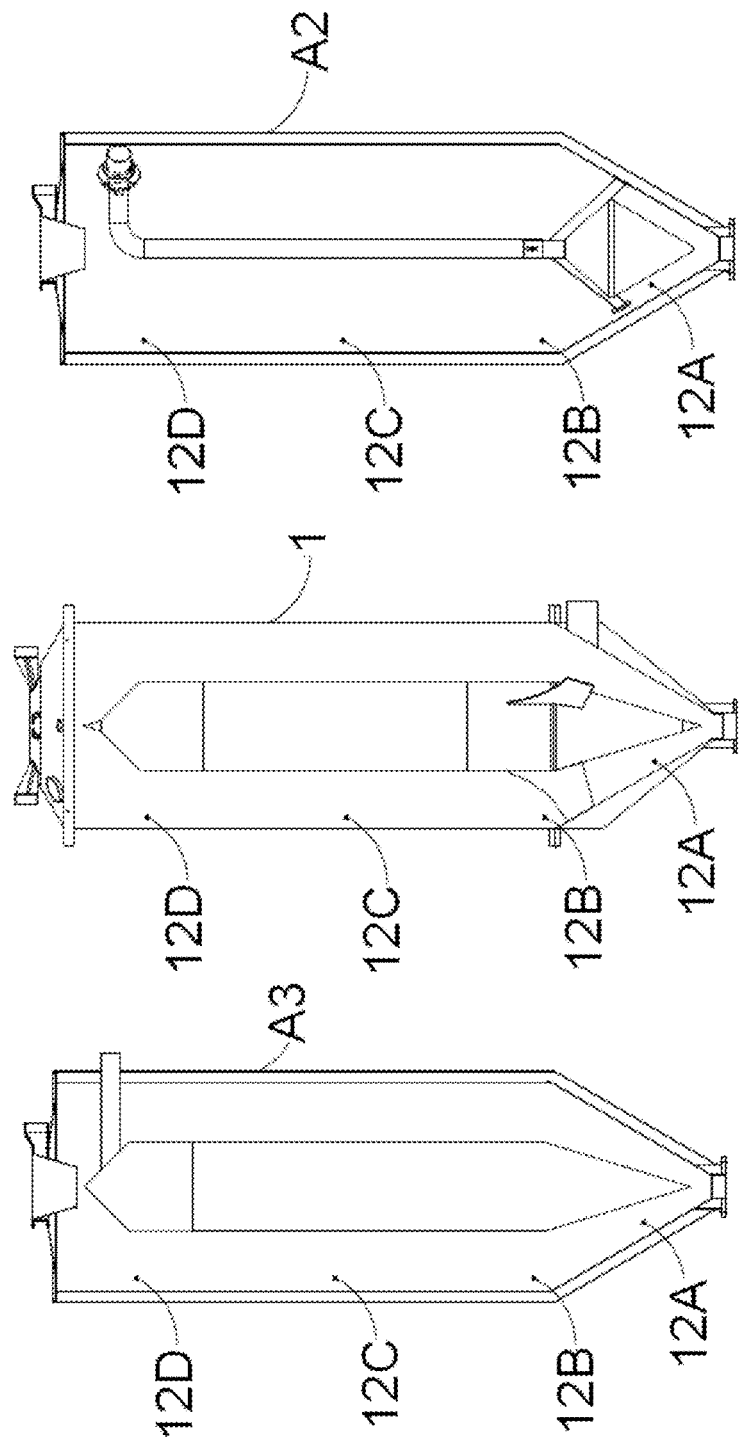
FIGS. 9a, 9b and 9c respectively illustrate two hoppers according to the state of the art and one hopper according to the present invention, in which temperature probes have been positioned for verifying the thermo-fluid-dynamic behavior in different hopper structures.

With reference to FIGS. 9a, 9b and 9c, hopper structures are illustrated in which temperature probes or sensors were arranged in the air space between the inner wall of the hopper and the insert at different levels marked by the letters 12A, 12B, 12C, 12D. More particularly, a sensor 12A is positioned at the tapered lower section 1c, a sensor 12B at the lower end of the cylindrical upper portion 1a, a sensor 12C at an intermediate position of the cylindrical upper portion 1a and finally a sensor 12D at the upper end of the cylindrical upper portion 1a.

It will be observed that the hopper structures illustrated in FIGS. 9a and 9c respectively correspond to the hopper structures according to the state of the art of FIGS. 3 and 2a, while the hopper structure illustrated in FIG. 9b corresponds to a hopper structure 1 according to the present invention illustrated in FIG. 7a.

Figure 10:
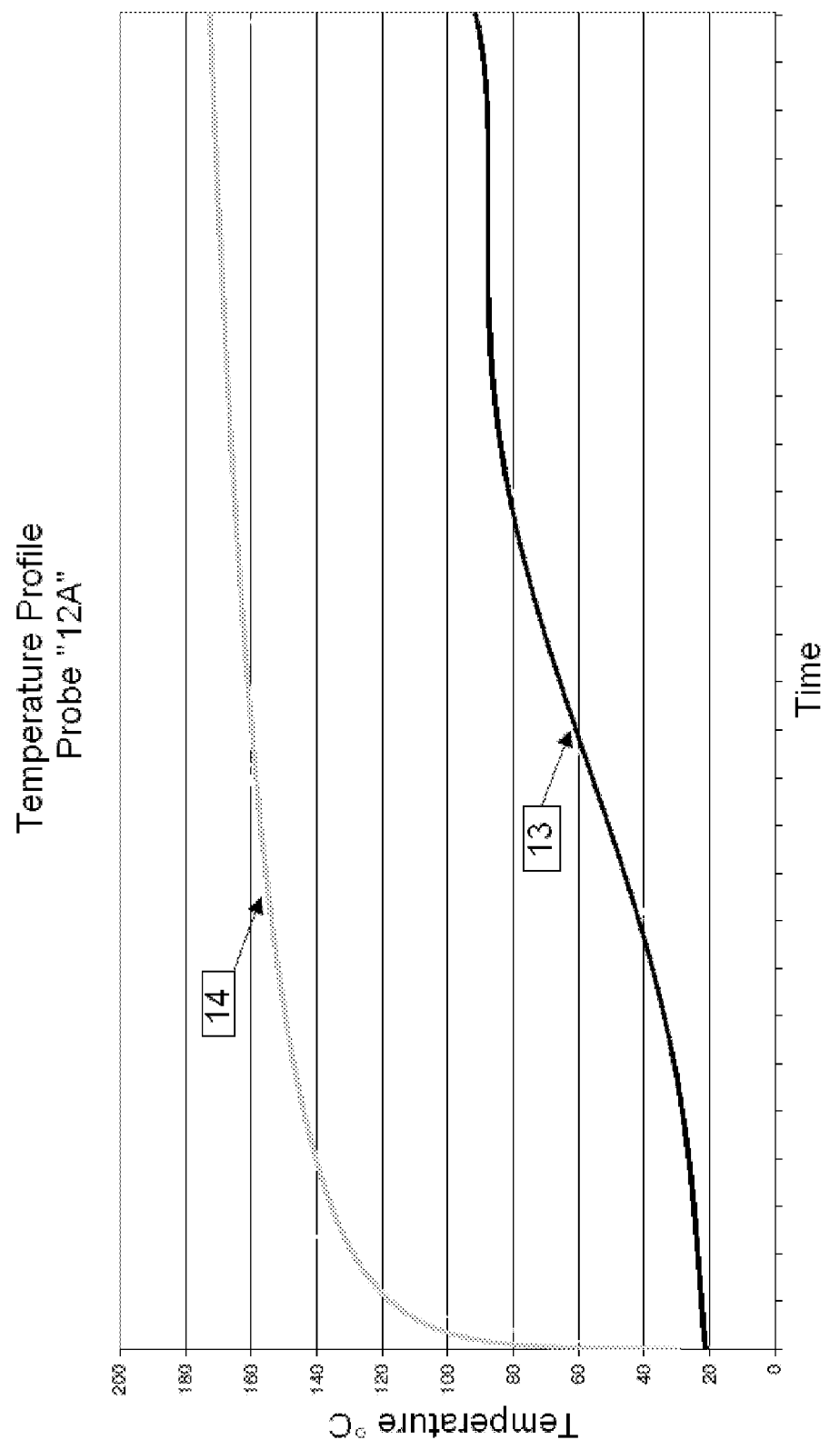

The graph of FIG. 10 represents the temperature detected by the probe 12A as a function of the time spent in the hopper structures of FIG. 9a (curve 13) and 9b (curve 14).

It will be observed that with a hopper structure according to the present invention (curve 14), the pre-established temperature (e.g. 180° C.) can be reached much more quickly. Otherwise, with a hopper structure according to the state of the art (curve 13), the temperature reached (after a long time interval) is less than 100° C.

The hopper structure according to the present invention (with tangential air insufflation in the chamber 25 and at the tapered lower portion) allows obtaining improved results due to a more uniform distribution in the air space AG containing the granular plastic material, and more particularly in the lower portion of the air space itself with respect to the hopper structure according to the prior art.

As is known, in order to obtain a manufactured item or final product with high quality plastic material, obtained from a granular plastic material leaving the hopper with a very low moisture level, it is essential to have a temperature variation in the radial sense (i.e. at a same level in the air space or gap of the hopper) which is as low as possible; otherwise, in the axial direction in the hopper (i.e. passing from one level to the other of the air space in the hopper) one must have a thermal gradient such that the greatest temperature is detected at the lower portion of the air space AG in the hopper and the lowest temperature at the top of the air space AG.

Tests were also conducted in order to evaluate the thermodynamic behavior both in a hopper structure according to the present invention and a hopper according to FIG. 2a. Results of such tests are illustrated in the graphs of FIGS. 11, 12 and 13.

Figure 11:
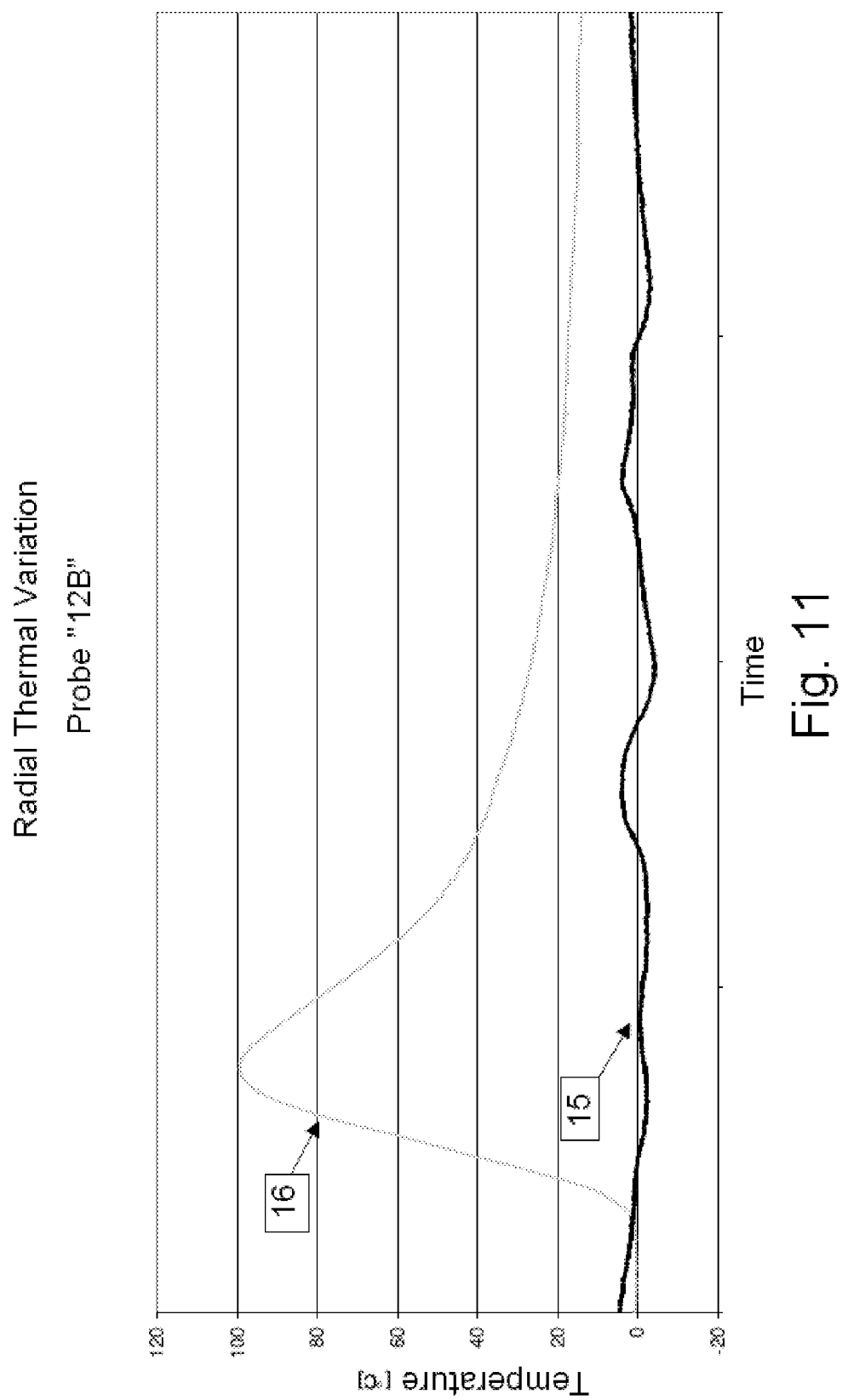
FIGS. 11 to 13 show graphs relative to the thermal variation profile at different levels in a dehumidification hopper according to the present invention illustrated in FIG. 9b and a hopper according to the state of the art illustrated in FIG. 9c.
Figure 12:
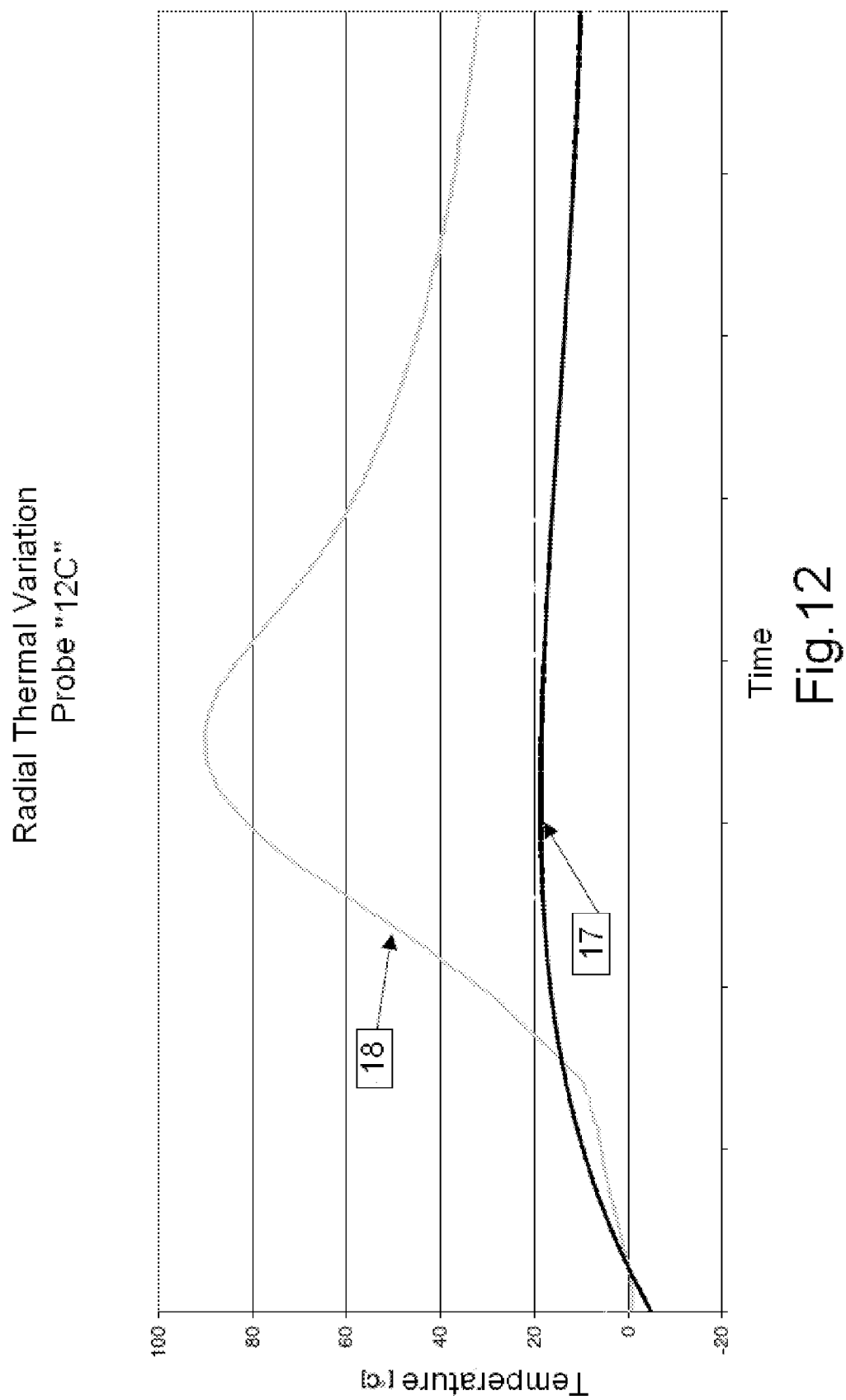
Figure 13:
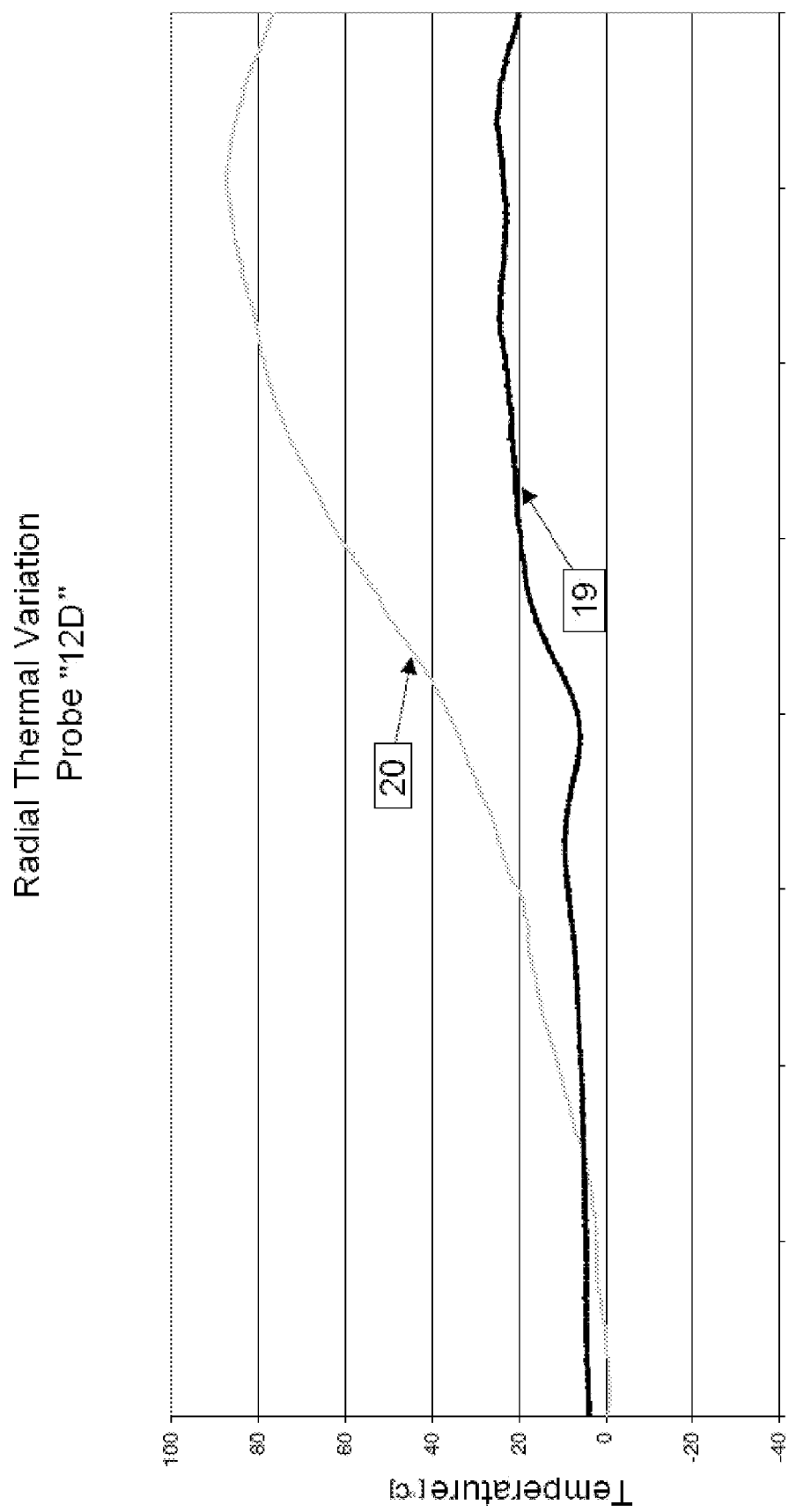

In FIGS. 11, 12 and 13, representative curves are illustrated of the temperature variations detected by the probes 12B, 12C and 12D as a function of the time spent in the hopper structures of FIG. 9b (curves 15, 17 and 19) and 9c (curves 16, 18 and 20). As will be understood, for the evaluation of the temperature variations at a same level or height in the hopper, movably mounted probes or sensors 12B, 12C and/or 12D can be provided for, which are thus moved, horizontally in use, and set to detect temperature values at several points of the same straight section or at the same level of the air space of the hopper, or two or more sensors 12B and/or 12C and/or 12D can be provided for, arranged at the same level, but at different points of the hopper.

Of course, the sensor or probe 12B, 12C or 12D was positioned at a greater distance from the inner wall of the hopper, above the limit layer termed "dynamic" due to the inner wall of the hopper or to the internal insert.

As will be observed, by analyzing the curves 16, 18 and 20, 100° C. peaks of thermal variation are attained, while with a hopper according to the present invention (curves 15, 17 and 19), values close to zero are detected.

This means that due to the hopper structure according to the present invention, the granular plastic material is at the same temperature along the entire radial direction, given the same section of the hopper itself.

It is therefore entirely clear that a hopper structure according to the present invention makes it possible to obtain a uniform motion field of the air flow inside the hopper.

It should also be considered that in the hopper structures according to the state of the art, the insufflation air flow passes through the insert at its center before being diffused in the material, and even if suitable insulating means are used, the walls of the hopper in the lower portion are always at a lower temperature than the desired dehumidification temperature. Moreover, according to such solutions, the air is fed at an intermediate zone of the hopper close to the insert, where there is a lower quantity of granular plastic material; the plastic material in fact mainly moves close to the inner wall of the hopper.

With the hopper structure according to the present invention, on the other hand, the temperature of the wall in contact with the material inside the hopper is at a temperature greater than or equal to that of the material adjacent to the central insert.

In addition, by inserting air via the chamber 25 and then through the wall with the small holes 27, a wider distribution surface is attained in the hopper than with the insertion via the conical lower surface of the insert. For a more immediate comparison reference is made to FIG. 4.

With a solution according to the present invention, it is therefore possible to uniformly distribute the process air in the granular plastic material. The motion field, in vectorial terms, results in uniform flow over the entire lower portion AG1 of the air space AG, the air flow having, given the same straight section, a tangential and a radial component, thus creating a whirling movement in the chamber 25 and consequently causing a uniform emission zone along the entire portion of the perforated sheet metal 27.

A poor distribution of the air flow negatively affects the heat exchange, which has repercussions according to the heat and material balance equations on the residual moisture of the granular material exiting from the hopper.

It is recalled that according to the Ranz and Marshall model of 1952, the overall heat exchange coefficient for a sphere immersed in a fluid current depends on the characteristics of the fluid current, such as velocity, density, compressibility and viscosity, which in turn, are dependent on the temperature.

Hence, it is also essential to have an optimal distribution of the fluid current in the material in order to obtain a high quality manufactured item.

With particular reference to the solution taught in the European patent application EP-2 090 856, the solution that is the object of the present patent application ensures:

on one hand, an improved distribution of the air throughout the air space, in particular along the entire circumference, particularly when a manifold chamber 25 is provided for, and on the other hand ensures a feeding of the air at the inner wall and not at the insert itself, and hence where a greater quantity of granular plastic material to be dehumidified is present.

Figure 14:
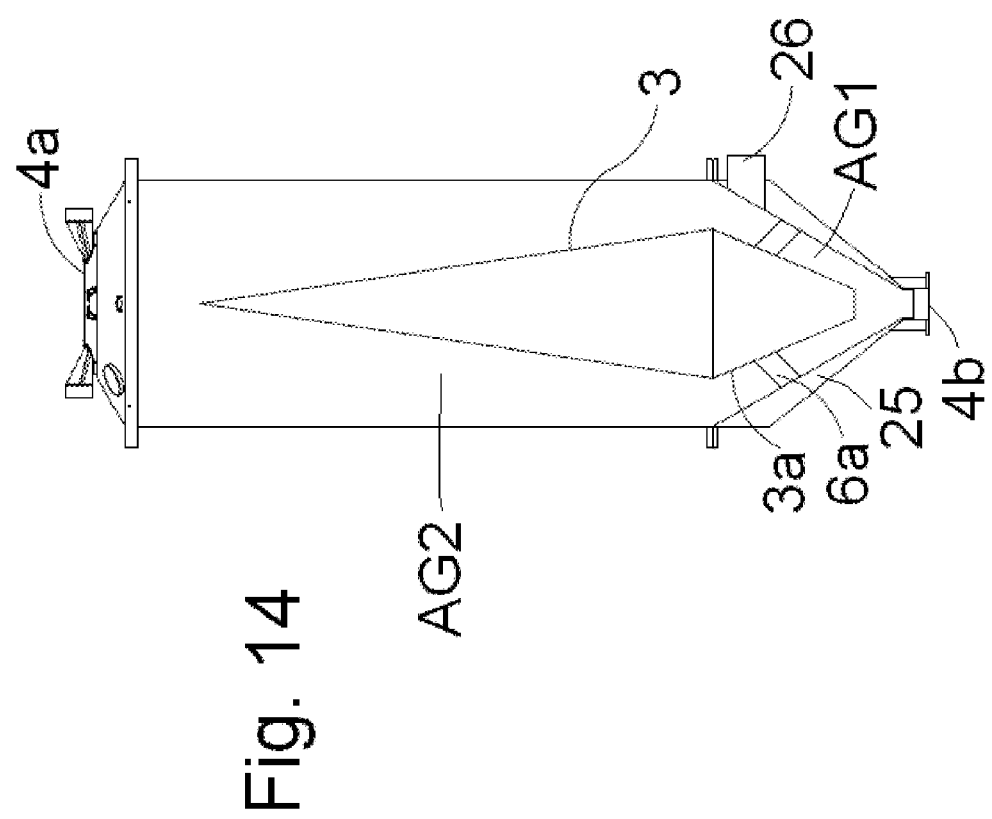
FIG. 14 is a view similar to FIG. 6a of another hopper structure embodiment in accordance with the present invention.

With reference now to FIG. 14, another embodiment is illustrated of a hopper structure according to the present invention, similar to that illustrated in FIGS. 6a and 7a, but in which the insert comprises a conical or frustoconical lower part with section increasing from the bottom to the top, fluid-seal connected with a conical or frustoconical upper part with section decreasing from the bottom to the top. Spacers 6a are also provided for at the tapered lower part. The upper conical or frustoconical section has much greater height than the lower conical or frustoconical section.

According to such hopper structure, a tangential insufflation or feeding is provided for the dehumidifying gaseous means (e.g. air) at the tapered lower portion. The tangential feeding is obtained by means of a duct 26 placed tangentially and leading into an annular chamber 25. The air then emitted in the annular chamber 25 by means of a tangential duct 26 exits into the sheet metal portion with small holes 27 of the lower tapered section of the inner wall 21, before being diffused into the granular material inside the hopper.

A hopper structure according to FIG. 14 does not allow achieving uniformity of distribution of the air and descent velocity of the granular material flow, like the structures according to the present invention described with reference to FIGS. 4 to 7b, but ensures an inner containment or housing volume for the granular plastic material above such hopper structures, and thus allows obtaining a good compromise between uniformity of distribution of the air and descent velocity, on one hand, and inner containment or housing volume on the other hand.

According to the present invention, the dehumidifying process fluid is a dehumidifying gaseous means, and the latter can for example be selected from the group comprising air and nitrogen.

The small holes 27 have a smaller size than the size of the granular plastic material to be dehumidified.

The hopper structure of the present invention differs from the hopper taught by U.S. Pat. No. 3,875,683, among other things, since it includes:

a fluid-sealed insert member; and a duct for supplying dehumidifying process fluid which is connected tangentially or in parallel to the enclosing wall or wall segment.

From, for example, FIG. 1 of U.S. Pat. No. 3,875,683, it is clear that the duct for supplying dehumidifying fluid is substantially radially oriented with respect to the wall of the hopper.

Moreover, it should be borne in mind that according to U.S. Pat. No. 3,875,683, either the external chamber or the insert must be filled with the dehumidifying fluid, and thus it would be useless and disadvantageous using a hopper in which the duct for supplying the dehumidifying fluid is oriented tangentially to the wall of the hopper.

Furthermore, beside such structural differences, the purpose of the invention of the present application is to provide a hopper structure in which the residence time is substantially constant, and in which the formation of thermal gradients of the granules at a same level in the hopper is prevented or drastically reduced, whereas the object of U.S. Pat. No. 3,875,683 is to devise a hopper in which the dehumidification gas temperature is kept constant in the whole annular space containing the material to be dehumidified.

The invention of the present application relates to a hopper structure suitable for obtaining a thermal gradient along the vertical axis, in which gaseous fluid is supplied into the lower zone of the hopper, rises into the annular space and heats the granular material. Therefore, the gaseous fluid is cooled, and it crosses the outlet duct at a temperature lower than the temperature of the exhaust gaseous fluid of U.S. Pat. No. 3,875,683, and thus remarkable energy savings are possible.

In view of the above, the hopper of the present invention structurally differs from the hopper taught by U.S. Pat. No. 3,875,683, aims at solving a different problem with respect to it, and it is more advantageous than the hopper of such prior US document, since, among other things, owing to the hopper according to the present invention the energy consumption is reduced.

In so far as FR-2 674 944 is concerned, it does not teach a hopper structure having a fluid-sealed insert member. As will be understood, part of the air will cross the holes of the perforated insert, and this will cause a pressure drop, and thus a higher amount of air (dehumidification fluid) would be required.

Moreover, such document teaches a hopper having an insert member much different than the insert member of the present invention. As a matter of fact, the insert member of FR-2 674 944 has an apex turned upward, whereas according to the present invention, the insert element is formed by a conical or frustoconical lower section which tapers towards the bottom, and an upper part, which is preferably cylindrical. In this regard, the statements made in connection with the hopper shown on FIG. 1a apply, i.e. the distribution of the treatment air current or flow in the material to be dehumidified is not uniform.

It should also be noted that according to FR-2 674 944, holes are formed throughout the whole length of the internal wall of the lower tapered section of the hopper, whereas according to the present invention the plurality of small holes are, preferably, made at a band only of the lower tapered section.

As a matter of fact, if holes are formed along the whole internal wall of the lower tapered section, as taught by FR-2 674 944, the dehumidifying fluid (e.g. air) can be discharged through the discharge opening for the granular material, and this could affect the dehumidification, since part of the air stream will not cross and dehumidify, in a counter-current relationship, the granular material. Moreover, should the hopper according to the present invention be replaced by a hopper having holes formed along the whole internal wall of the lower tapered section, as taught by FR-2 674 944, production could be reduced, since problems or difficulties in discharging the granular material will occur.

The person skilled in the art, bearing in mind the above-mentioned prior solutions, would have been motivated to devise or improve a solution in which the air or dehumidifying fluid is supplied directly in the insert member, and subsequently diffused in the perforated lower portion of the insert member.

Such a solution is similar to the solution taught by EP-2 090 856, which is in the name of the applicant of the present invention.

The applicant, after having devised the hopper of EP-2 090 856, has carried out a number of tests, owing to which, it has been proven (see, for example, FIG. 10) that using a hopper including, among other things, a fluid-sealed insert member, a chamber external to the annular space delimited between a wall of the hopper and the insert member, and a duct for supplying dehumidifying fluid to the external chamber, which is oriented tangentially or parallel to the chamber, the above-mentioned improved results are obtainable.

Anyway, should the above-mentioned prior art be (for an unknown reason) combined, the thus-obtained hopper structure would include a perforated insert member, and not a fluid-sealed insert member as included in the subject-matter of the present invention.

The hopper structure described above is susceptible to numerous modifications and variants within the protection scope as defined by the contents of the claims.

Thus, for example, several feed ducts 26 can be provided for, tangentially anchored in angularly spaced positions and intended to feed dehumidifying gaseous means into respective chambers 25. For such purpose, several chambers 25 can be provided; they can even be non-annular but with a circular sector distributed along the perimeter of the tapered lower section 1c.

In addition, it will be understood that the hopper could have a square section or in any case a non-circular section, and in such case each wall described above, e.g. the walls 8, 9, 22, 23 would be formed by several mutually tilted sections. In the case of square section hopper, for example, the process fluid feed duct 26 could be substantially parallel to a respective wall or wall section 9 or 23.

The chamber 25 could be placed in fluid communication with the annular air space AG by means of an opening, a hole or in any case an intermediate duct, and hence not necessarily with a plurality of small holes.

What is claimed is:

1. A hopper structure for the dehumidification of granular plastic material by means of a dehumidifying process fluid, including:
   a main body, bearing, at the top in use, a closure wall with loading opening or mouth for the granular plastic material to be treated;
   at least one discharge mouth or opening for the process fluid provided on said main body or on said closure wall,
   a tapered lower section terminating with a discharge opening for the dehumidified granular plastic material,
   an insert member fluid-sealed and positionable in the main body and in the tapered section so as to delimit an annular air space therewith, said insert member comprising at least one conical or frustoconical lower part, which tapers towards a bottom thereof, and an upper part, and
   at least one dehumidifying process fluid feed duct to said annular air space,
   wherein the tapered lower section comprises at least one pair of walls or wall segments comprising: a wall or wall segment at least partially enclosing the other wall or wall segment, so as to delimit at least one chamber therewith that is outside said annular air space and in fluid communication therewith, said at least one chamber being feedable with dehumidifying process fluid from said at least one dehumidifying process fluid feed duct oriented tangentially or parallel to said enclosing wall or wall segment, and
   said tapered lower section comprises an upper frustoconical segment, an intermediate segment and a lower frustoconical segment, the upper frustoconical segment having conicity different from the conicity of said lower frustoconical segment and being extended therein so as to delimit said chamber, a top of the upper frustoconical segment having a greater radius than the intermediate segment.

2. A structure according to claim 1, wherein said chamber is annular.

3. A structure according to claim 1, wherein said upper frustoconical segment is extended inside and over the entire length of the intermediate and lower segments.

4. A structure according to claim 3, wherein said upper frustoconical segment communicates at its own lower end with the at least one discharge mouth.

5. A structure according to claim 1, wherein said upper frustoconical segment communicates at its own lower end with the at least one discharge mouth, and wherein said upper frustoconical segment communicates and is connected with a sleeve duct, to which the lower end of said lower segment is also connected.

6. A structure according to claim 1, wherein said chamber is in fluid communication with said annular air space through a plurality of small holes.

7. A structure according to claim 1, wherein said chamber is in fluid communication with said annular air space through a plurality of small holes, and wherein said plurality of small holes are made only at a band of said upper frustoconical segment for a height corresponding to at least the height of said intermediate section and less than the height of the tapered lower section.

8. A structure according to claim 1, wherein said upper frustoconical segment is welded or otherwise fixed with fluid seal to an upper edge of said intermediate segment.

9. A structure according to claim 1, wherein said upper part of said insert member is cylindrical.

10. A structure according to claim 1, wherein an upper end of said tapered lower section and an upper end of said conical or frustoconical lower part of said insert member are, in use, at a same level.

11. A structure according to claim 1, wherein said chamber is a manifold of the process fluid, homogenizing the pressure of the process fluid before passage of the process fluid into said annular air space.

12. A treatment plant for granular plastic material, comprising a hopper according to claim 1, a feeder of granular plastic material into said hopper, conveyor means intended to convey, to a user, metered quantities of dehumidified granular plastic material coming from said hopper, and a dryer set to supply dehumidifying process fluid to said hopper.

13. A structure according to claim 7, wherein said height of said plurality of small holes corresponds to the height of said intermediate section.

14. A method of dehumidifying granular plastic material comprising the following steps:
   prearranging a hopper structure for the dehumidification of granular plastic material by means of a dehumidifying process fluid, including:
   a main body, bearing, at the top in use, a closure wall with loading opening or mouth for the granular plastic material to be treated;
   at least one discharge mouth or opening for the process fluid provided on said main body or on said closure wall, a tapered lower section terminating with a discharge opening for the dehumidified granular plastic material, an insert member fluid-sealed and positionable in the main body and in the tapered lower section so as to delimit an annular air space therewith, said insert member comprising at least one conical or frustoconical lower part, which tapers towards a bottom thereof, and an upper part, and at least one dehumidifying process fluid feed duct to said annular air space, the tapered lower section comprising at least one pair of walls or wall segments comprising: a wall or wall segment at least partially enclosing the other wall or wall segment, so as to delimit at least one chamber therewith that is outside said annular air space and in fluid communication therewith, said at least one chamber being feedable with dehumidifying process fluid from said at least one dehumidifying process fluid feed duct oriented tangentially or parallel to said enclosing wall or wall segment;

feeding granular plastic material at said upper loading mouth; and feeding dehumidifying process fluid into said at least one dehumidifying process fluid feed duct and thus into said chamber, and subsequently into said annular air space, wherein said tapered lower section comprises an upper frustoconical segment, an intermediate segment, and a lower frustoconical segment, the upper frustoconical segment having conicity different from the conicity of said lower frustoconical segment and being extended therein to delimit said chamber, a top of the upper frustoconical segment having a greater radius than the intermediate segment.

15. A dehumidification method according to claim 14, further comprising a step of:

tangentially feeding dehumidifying process fluid into said chamber, so as to create a whirling state therein for obtaining a uniform insertion of fluid into said annular air space.

* * * * *